Figures 1, 2:
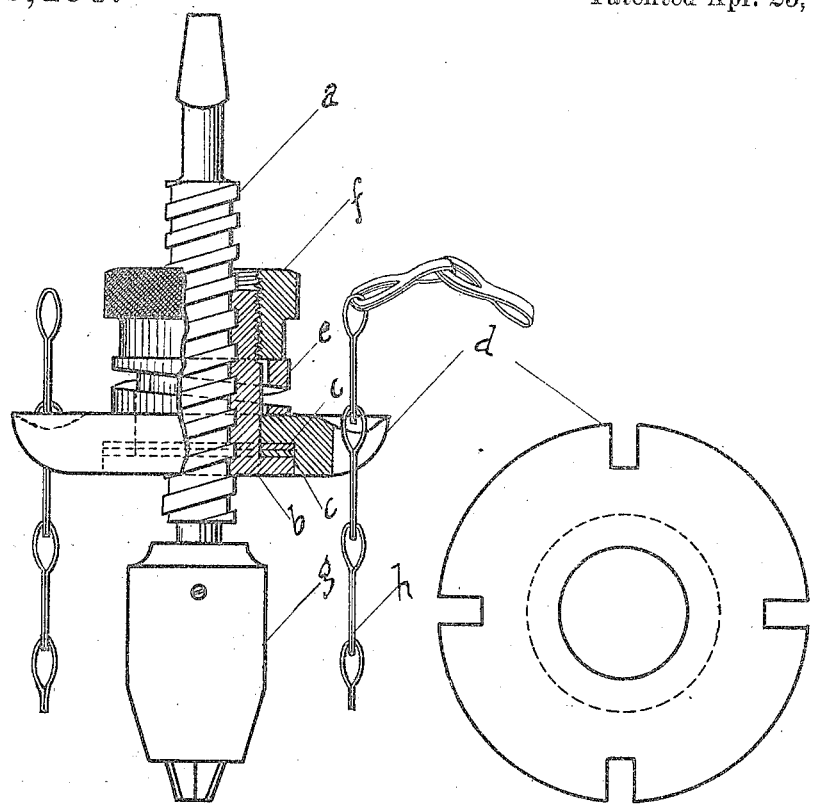

UNITED STATES PATENT OFFICE.

JAMES WALTER A. McKILLICAN, OF MONTREAL, QUEBEC, CANADA, ASSIGNOR OF ONE-HALF TO EDWARD SWEETING AND HYMAN I. ELIASOPH, BOTH OF MONTREAL, QUEBEC, CANADA.

AUTOMATIC FEED OR PRESSURE MACHINE.

1,180,406.             Specification of Letters Patent.        Patented Apr. 25, 1916.

Application filed April 9, 1914. Serial No. 830,821.

*To all whom it may concern:*

Be it known that I, JAMES WALTER A. MCKILLICAN, residing at 846 West St. Catherine street, in the city of Montreal, in the Province of Quebec, Canada, have invented a new and useful Improvement in Automatic Feed or Pressure Machines, of which the following is a specification.

This invention relates generally to machines requiring automatic feed or continuous pressure, without positive gearing.

The object of the invention, is to provide a contrivance that may be attached to a brace, ratchet, lathe, motor or any revolving apparatus, for the purpose of supplying a given amount of feed to different sizes of tools and to different qualities of material, by a simple adjustment of the tension supplied to the friction head by the adjustment of the nut which is engaged by a spring.

The invention consists of the construction, combination and arrangement of parts as herein illustrated as a hand driven drilling apparatus as an example.

In the accompanying drawings, forming part of this application, I have illustrated a form of embodiment and a top view of the stationary friction plate or disk $d$.

Figure 1, is a semilongitudinal section of the entire machine. Fig. 2, is a perspective detail view of the plate or disk.

The apparatus comprises a heavily threaded shank $a$, provided at one end with a tool holder $g$, and at the other end with means for engaging the socket of a bit brace, ratchet, motor or other implement employed in turning the shank. Fitted on shank $a$, is an actuating collar with a flange at $b$. The collar is of sufficient length to pass through the disk $d$, ring or washers $c$—$c$, spiral spring $e$, and feed regulating nut $f$, which is fitted to screw onto the end of collar $b$, employed for regulating the frictional pressure on the slip bearing washers $c$—$c$, disposed one against the flange of actuating collar $b$, and the other against the bearing part of stationary disk $d$, which is concaved and fitted with four slots diametrically opposite each other for the purpose of engaging chains $h$, or other means employed in holding the apparatus properly positioned with relation to the object being worked. Disk $d$, may or may not be fitted with a recess to receive the washers $c$—$c$, and the flange of the collar $b$.

In operating the device a slow feed is obtained by placing slight pressure on the spring, thus allowing the collar to rotate freely within the head or disk. The pressure exerted by the rubbing of the washers in the slip bearing causing sufficient frictional resistance to the threads of the shank to cause the latter to feed downward. A faster feed is obtained by tightening the nut against the spring thus increasing the frictional contact in the head pieces.

Balls or rollers may be used instead of washers or rings in operating the frictional head pieces. The washers are used for the purpose of taking up the wear of the apparatus, and may readily be replaced.

It is obvious that various changes may be made in the construction of the mechanism for actuating the parts, particularly the elastic principle of the friction parts, without departing from the spirit of the claim. I therefore do not limit myself to any form of elastic cushion or spring for the purpose of regulating the feed.

Having thus described my invention, what I claim as new and desire to secure by Letters Patent is:

A yielding frictional feed for feeding a rotatable tool to the work to be operated upon comprising a rotatable threaded shaft for supporting and rotating an operative tool, a collar threaded thereon and having at one end a seat, an adjusting nut threaded on said collar at the other end, a disk rotatably mounted on said collar, said disk being provided with means for clamping the tool to the work, frictional washers or rings to take up the wear mounted between the bearing seat of the collar and the work holding the disk, an elastic means mounted on said collar and adjusted by said nut for the purpose of regulating the feed of the tool.

JAMES WALTER A. McKILLICAN.

Witnesses:
JAMES McNEIL,
R. D. CLARK.

Copies of this patent may be obtained for five cents each, by addressing the "Commissioner of Patents, Washington, D. C."